(12) United States Patent
Hu

(10) Patent No.: US 7,813,097 B2
(45) Date of Patent: Oct. 12, 2010

(54) APPARATUS AND METHOD FOR DETECTING AN ERROR IN A POWER SIGNAL

(75) Inventor: Jing Hu, Neubiberg (DE)

(73) Assignee: Infineon Technologies AG, Munich (DE)

( * ) Notice: Subject to any disclaimer, the term of this patent is extended or adjusted under 35 U.S.C. 154(b) by 1076 days.

(21) Appl. No.: 11/459,439

(22) Filed: Jul. 24, 2006

(65) Prior Publication Data

US 2007/0024288 A1 Feb. 1, 2007

(30) Foreign Application Priority Data

Jul. 29, 2005 (EP) ................... 05016587

(51) Int. Cl.
    *H02H 3/08* (2006.01)
(52) U.S. Cl. .................................... 361/93.7
(58) Field of Classification Search ................ 361/93.7
    See application file for complete search history.

(56) References Cited

U.S. PATENT DOCUMENTS

| 5,416,689 | A | | 5/1995 | Silverstein et al. | ............ 363/56 |
| 5,912,794 | A | | 6/1999 | Ichikawa | .................... 361/92 |
| 5,973,416 | A | * | 10/1999 | Guenther | .................... 307/125 |
| 6,304,657 | B1 | * | 10/2001 | Yokota et al. | ................. 380/28 |
| 6,570,369 | B2 | * | 5/2003 | Tamai et al. | ................. 323/288 |
| 2002/0027757 | A1 | * | 3/2002 | Sudou et al. | ............... 361/93.1 |
| 2002/0089860 | A1 | * | 7/2002 | Kashima et al. | ............... 363/13 |

FOREIGN PATENT DOCUMENTS

JP 01303053 A * 12/1989

OTHER PUBLICATIONS

Hang-Seok Choi et al., Protection Schemes for Various Fault Conditions Off-Line Flyback Converters, 35th Annual IEEE Power Electronics Specialist Conference, pp. 4355-4359, 2004.

* cited by examiner

*Primary Examiner*—Jared J Fureman
*Assistant Examiner*—Ann T Hoang
(74) *Attorney, Agent, or Firm*—Eschweiler & Associates, LLC

(57) ABSTRACT

An error detection apparatus for detecting an error in a power signal output by an external device switchable by a switching signal has a comparing unit for comparing the power signal with a reference signal to yield a comparison signal, a switching unit for providing the switching signal dependent on a control signal with the switching unit being designed to disregard the control signal and to ensure that the external device is switched off upon provision of a triggering signal to the switching unit, and a triggering unit for providing the triggering signal depending on the control signal and the comparison signal. Alternatively, the error detection apparatus has an influencing unit for influencing the power signal, such that the power signal fulfils a predetermined relationship to a reference signal in the case of an occurrence of the error, whereas the relationship is not fulfilled in the absence of the error.

18 Claims, 5 Drawing Sheets

APPARATUS AND METHOD FOR DETECTING AN ERROR IN A POWER SIGNAL

CROSS-REFERENCE TO RELATED APPLICATIONS

This application claims priority from European Patent Application No. 05016587.7, which was filed on Jul. 29, 2005, and is incorporated herein by reference in its entirety.

TECHNICAL FIELD

The present invention relates to an apparatus and method for detecting an error in a power signal output by a switchable, external device, such as a switchable power supply.

BACKGROUND

In modern current mode controlled power supply converters, turn-off is determined by comparison of a feedback or reference signal, which is typically fed back from the secondary side to the primary side of a power converter for an output voltage regulation, and a current sensing signal or a power signal obtained from the power supply converter. FIG. 4 shows a possible realization of a circuitry suitable for determining the turn-off of such an external device. The circuitry of FIG. 4 is implemented on a control IC 800 (IC=integrated circuit) with an input 800a for the power signal or the current sensing signal $V_{cs}$, where cs stands for current sensing, an input 800b for the feedback signal, an input 800c for a ground potential, an output 800d for a switching signal dedicated for switching the power supply converter as described in more detail below and an input 800e for the power supply voltage $V_{cc}$ of the control IC 800. In other words, the feedback voltage is typically fed back from the secondary side to the primary side of a power converter for output voltage regulation. Usually the output voltage is sensed by a voltage divider and then coupled via an optocoupler to the primary side of the power converter, which is often realized via an input of the control IC 800 in case an electrical isolation between the primary side and the secondary side is needed, but which is not shown in FIG. 4. Otherwise, the optocoupler is obsolete and does not have to be implemented and used.

Furthermore, FIG. 4 shows a transformer of a power supply converter 810, a power switch 820 with terminals 820a and 820b and a control input 820c for the switching signal, as well as a sensing resistor 830. The output 800d of IC 800 is connected to the control input 820c of power switch 820, and the input 800a of IC 800 is connected to a circuit node connecting terminal 820b of power switch 820 and resistor 830. Internally, control IC 800 comprises a surveillance means 840, and a switching means 850, which are connected in series between input 800a and output 800d. The surveillance means 840 is dedicated to check whether the voltage or power signal at input 800a assumes an undesired state indicative of a turn-off of the power supply converter and comprises an amplifying circuit 875, which, in turn, comprises an operational amplifier 880, and two resistors 890 and 900. The surveillance means 840 comprises also a comparator 910 and a flip-flop 920 with a reset input R for resetting the flip-flop, a set input S for setting the flip-flop and an output Q for outputting the current state of the flip-flop 920. The switching means 850 comprises a gate driver or driving means 860, as well as a protection means 870. The driving means 860 is dedicated to control the power switch 820 responsive to the control signal output by the surveillance means 840, while the protection unit is able to disable the gate driver 860.

The output of the power supply converter 810 is connected to the input 820a of the power switch 820, and the output 820b of the switch 820 is connected to both the sensing resistor 830 with the resistance $R_{sense}$ and the input 800a of the control IC 800. Furthermore, the sensing resistor 830 is connected to the ground potential. Inside the controller IC 800, input 800a is connected to an input of the surveillance means 840 and to a non-inverting input of the operational amplifier 880, respectively. An output of the operational amplifier 880 is connected to a non-inverting input of the comparator 910, as well as via the resistor 890 to an inverting input of the operational amplifier 880. Further, the inverting input of the operational amplifier 880 is connected to an internal off-set voltage potential $V_{os}$ via resistor 900, the operational amplifier 880 and the resistors 890, 900 thus forming a non-inverting amplifying circuit 875 providing an amplified signal $V_1$ derived from the power signal at the output of the operational amplifier 880 with the potential $V_{os}$ being set to adjust the amplification behavior of the amplifying circuit 875 to a desired behavior. An inverting input of the comparator 910 is connected to the input 800b of the control IC 800. An output of the comparator 910 is connected to input R of flip-flop 920, while input S is connected to some activation signal to be described in more detail below and created externally with respect to the components of the IC 800 shown in FIG. 4 but, for example, internally with respect to the IC 800. The output Q of the flip-flop 920 represents the output of the surveillance means 840, where the control signal is output and is fed to an input of the switching means 850 and an input of the driving means 860, respectively. An output of the driving means 860 represents the output of the switching means 850 and is connected the output 800d of the control IC 800. Inside the switching means 850 the protection means 870 is connected to a control input of the driving means 860 via a signal line in order to influence the operation of the driving means 860 by a fault signal as will be described in more detail below.

After having described the design of the circuitry of FIG. 4, the operation of this design is described with respect to both, FIG. 4 and FIG. 5, wherein FIG. 5 shows a comparison of a time evolution or waveform of an exemplary amplified power signal $V_1$ output by the amplifying circuit 875 and of a corresponding control signal $V_c$ output by the surveillance means 840. The time is plotted against the x-axis in an aligned manner for the two vertically arranged graphs, and the voltages $V_1$ and $V_c$ against the corresponding y-axes. As it will turn out from the following discussion, the circuit of FIG. 4 shows a part of a modern current mode controlled power supply converter or at least a part thereof, which turn-off is determined by a comparison of the feedback signal and the current sensing signal or the amplified power signal, respectively and IC 800 represents a system for the turn-off determination of a current mode controller. Exemplary waveforms occurring in IC 800 with regard to switching signal generation are shown in FIG. 5.

To monitor the state of the power supply converter or power supply 810, if turned on, the current created by the power supply or power supply converter 810 is fed through a sensing resistor or shunt resistor 830. The resulting voltage drop $V_{cs}$ across the sensing resistor is fed as the power or current sensing signal to the control IC 800 and, in particular, to the input 800a of the control IC 800. The operational amplifier 880, along with the two resistors 890 and 900, amplifies the power signal and provides the comparator 910 with the amplified voltage signal $V_1$. If this amplified voltage signal $V_1$ is larger than the feedback signal $V_{FB}$, which is applied to the input 800b of the control IC 800, the comparator 910 outputs a signal, which is fed to the input R of the flip-flop, resulting in a reset of flip-flop 920. As a result, the output Q of the flip-flop or storage means 920 is erased or becomes LO, i.e. the control signal $V_c$ becomes $V_{LO}$. The driving means 860, which receives the control signal $V_c$, drives the gate of the power switch, as long as the fault signal provided by the protection means 870 is LO, depending on the control signal $V_c$ nd drives the power switch 820 to be opened independent of the control signal $V_c$, if the fault signal is HI, for example. Of course circuit 800 could be alternatively designed such that the above mentioned logical signal values switch from LO to HI and vice versa. Thus, as a result of the control signal $V_c$ getting LO, the switching signal provided at the output of the switching means 850 and, as a consequence, at the output 800d of the control IC 800 assumes a value resulting in the power switch 820 opening. To close the power switch 820 again, an activation signal is applied to the set input S of the flip-flop 920 by an internal or external means. The activation signal can be created by an element outside the circuit shown in FIG. 4, but which can be part of the control IC 800. Providing the set input S of the flip-flop 920 with the activation signal yields a change of the control signal provided to the switching means 850 and hence to the gate driver 860. The gate driver 860 will then create the switching signal, which is applied to the control input 820c of the power switch 820 resulting in closing the power switch 820 and hence a turn-on of the power supply converter 810 and a magnetization of the power transformer 810, respectively, unless the protection means 870 provides the gate driver 860 with a fault signal such that the gate driver 860 ignores the control signal and provides the power switch 820 with a switching signal yielding an open state of the power switch 820.

According to the example of FIG. 5 showing the time evolution of the amplified power signal $V_1$ and the control signal $V_c$, at the time $t=t_1$ and $t=t_3$ the storage means 920 is activated by an activation signal at the input S, which results in increasing the control signal $V_c$ provided at the output Q from a voltage level $V_{LO}$ to a voltage level $V_{HI}$. At the two moments $t=t2$ and $t=t4$, as illustrated in FIG. 5, the amplified power signal $V_1$, becomes larger than the feedback voltage $V_{FB}$, so that the comparator 910 provides the flip-flop 920 at its input R with a HI signal, so that the control signal $V_c$ changes from a voltage level $V_{HI}$ to a voltage level $V_{LO}$. As a result, the gate driver or driving means 860 provides the power switch 820 with a switching signal which results in switching off the power switch 820. In other words, in the current mode converter system shown in FIG. 4, the primary current is sensed by the shunt resistor or sensing resistor 830, wherein the voltage across the shunt resistor or sensing resistor 830 is amplified inside the control IC 800 depending on the off-set voltage $V_{os}$ applied, and the turn-on is triggered by the internal or external activation signal at the set input S of the flip-flop 920. The output voltage $V_1$ of the operational amplifier 880 is compared with the feedback voltage $V_{FB}$ by the comparator 910 for the switching-off signal or reset signal generation. As shown in FIG. 5, once the voltage $V_1$ becomes larger than the feedback voltage $V_{FB}$, the PWM flip-flop 920, which stands for pulse-width modulator, is turned over, and the power switch 820 is switched off.

The control IC 800 described above can be used to detect undesired states of operation of the power supply converter 810, wherein the states may be characterized by the power signal or, more precisely, by the signal derived from the power signal, i.e. the amplified power signal $V_1$, exceeding the feedback voltage $V_{FB}$. In other words, the voltage across the shunt resistor or sensing resistor 830 $V_{cs}$ is compared with a certain reference voltage $V_{FB}$ for short-winding protection. Once the voltage exceeds the reference voltage, the protection circuit or the surveillance means 840 shuts down the gate driver or driving means 860, and the power switch 820 is then switched off.

However, this protection cannot provide full protection in some failure situations or in the case of an error related to the input 800a conveying the power signal of the control IC 800 or to the related pin. As shown above, the power signal or the voltage $V_{cs}$ is one of the pieces of key information for turn-off determination. An error with respect to this pin can lead to drastic consequences. Apart from damage to or destruction of the control IC 800 or the power switch 820 or the power supply or the power supply converter 810, which can result in direct or indirect losses of money for repairs or replacement, also the health or life of human beings may be endangered.

Examples for errors with respect to input 800a of the control IC 800 comprise an open circuit at the pin related to input 800a, an interruption of one of the lines connected to the terminals of the sensing resistor 830 or a short circuit of the pin related to input 800a to ground. In other words, examples are open circuits of the pin $V_{cs}$ to external, open shunt resistor or short circuit of this pin to the system ground. For instance, if the connection between the input 800a of the control IC 800 and the output of the switch 820b is broken, the voltage level of the power signal $V_{cs}$ floats in an undetermined way as input 800a is directly connected to the non-inverting input 880a of the operational amplifier 880 of the surveillance means 840 due to the high input impedance of operational amplifiers in general. In this case, the power signal measured by the control IC 800 is no longer related to the primary current of the power transformer 810 in any way. This may lead to an unpredictable switching on and off of the power switch 820 and may also lead to operating the power supply or power supply converter outside of its specifications. In other words, once pin 800a is open circuit to external, the voltage at this pin is then floating since this pin is connected to the high Ohmic input of operation amplifiers or operators internally. As a result, the turn-off of the main power switch is not in relation to the real primary current, and it may result in unpredictable situations for the converter system, not regulated output voltage or even damage of the power converter system.

In the case where the pin related to input 800a of the control IC 800 is short-circuited to ground, the surveillance means 840 is not able to turn off the switch 820 at all, as the power signal $V_{cs}$ measured by the control IC 800 and the surveillance means 840 is always smaller than the feedback signal $V_{FB}$ provided to the control IC 800 and the surveillance means 840, so that the comparator 910 is not able to provide the storage means 920 with a HI as reset signal. In other words, in the case where the pin related to input 800a is short-circuited to ground, the main power switch 820 will never be switched off, which leads to saturation of the transformer 810, over-current of the main power switch 820 and possible permanent damage to the power converter or power supply. In other words, both an open circuit and a short circuit to ground of this pin, may destroy the whole converter system.

If, as a third example, the line between switch output 820b and the sensing resistor 830 is broken or the connection between the sensing resistor and the ground is broken, such that the primary current has to pass input 800a of the control IC 800, a very high voltage can appear at the operational amplifier 880 due to the high input impedance of operational amplifiers in general, such that the control IC 800 can be destroyed yielding an undefined state of the switch 820, which may result in damage to or the destruction of the power supply converter.

From the above follows, that some protection scheme should be applied to the pin related to input 800a to prevent such consequences from happening due to failures of non-proper connection of this pin. So far, no protection against these failures is in the current situation available in existing control ICs.

SUMMARY

An error detection apparatus for detecting an error in a power signal output by an external device switchable by a switching signal is provided, which may enable a safer and more reliable operation of such an external device.

In one embodiment, an error detection apparatus for detecting an error in a power signal output by an external device switchable by a switching signal may have a comparing unit adapted for comparing the power signal or a signal derived from the power signal with a reference signal in order to yield a comparison signal, a switching unit adapted for providing the switching signal to the external device dependent on a control signal, the switching unit being designed to disregard the control signal and to ensure that the external device is switched off upon provision of a triggering signal to the switching unit, and a triggering unit adapted for providing the triggering signal to the switching unit depending on the control signal and the comparison signal, or depending on the switching signal and the comparison signal.

BRIEF DESCRIPTION OF THE DRAWINGS

Preferred embodiments are described hereinafter making reference to the appended drawings.

DETAILED DESCRIPTION

Figure 1:
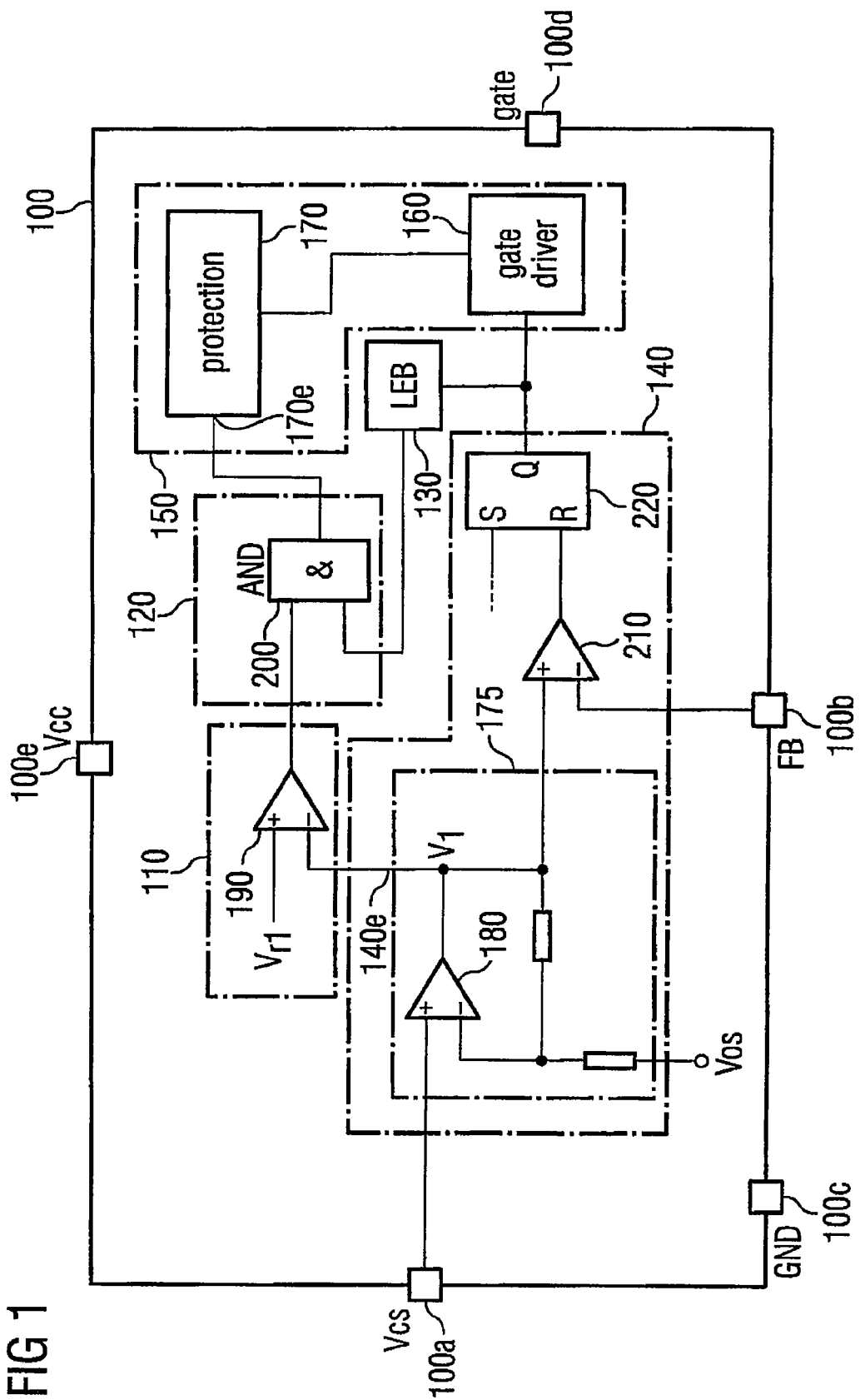
FIG. 1 shows the circuitry of a control IC including an apparatus according to a first embodiment.

In an embodiment, an error detection apparatus for detecting an error in a power signal output by a external device switchable by a switching signal may have: an influencing unit adapted for influencing the power signal or a signal derived from the power signal, such that the power signal or the signal derived from the power signal has a predetermined relationship to a reference signal in the case of the occurrence of the error, and that the power signal or the signal derived from the power signal does not fulfill the predetermined relationship with respect to the reference signal in the case of an absence of the error; a switching unit adapted for providing the switching signal to the external device dependent on a control signal, the switching unit being designed to disregard the control signal and to ensure that the external device is switched off upon provision of a triggering signal to the switching unit; and a triggering unit adapted for providing the triggering signal to the switching unit depending on as to whether the power signal has the predetermined relationship to the reference signal.

In another embodiment, an error detecting method for detecting an error in a power signal output by an external device switchable by a switching signal may have the steps of comparing the power signal or a signal derived from the power signal with a reference signal in order to yield a comparison signal; providing the switching signal to the external device dependent on a control signal by means of a switching unit, wherein the stop of providing is performed such that the control signal is disregarded and it is ensured that the external device is switched off upon provision of a triggering signal to the switching unit; and providing the triggering signal to the switching unit depending on the control signal and the comparison signal.

In another embodiment, an error detection method for detecting an error in the power signal output by an external device switchable by a switching signal may have the steps of influencing the power signal or a signal derived from the power signal, such that the power signal or the signal derived from the power signal has a predetermined relationship to a reference signal in the case of an occurrence of the error, and that the power signal or the signal derived from the power signal does not fulfill the predetermined relationship with respect to the reference signal in the case of an absence of the error; providing the switching signal to the external device dependent on a control signal by means of a switching unit, wherein the step of providing is performed such that the control signal is disregarded and it is ensured that the external device is switched off once a triggering signal is provided to the switching unit; and providing the triggering signal to the switching unit depending on as to whether the power signal has a predetermined relationship to the reference signal.

In another embodiment, a computer program may have a program code for executing the first above-mentioned method, if the computer program is executed on a computer.

In another embodiment, a computer program may have a program code for executing the second above-mentioned method, if the computer program is executed on a computer.

In one embodiment, an error detection apparatus for detecting an error in a power signal output by an external device switchable by a switching signal, comprises:

a comparing means adapted for comparing the power signal or a signal derived from the power signal with a reference signal in order to yield a comparison signal;

a switching means adapted for providing the switching signal to the external device dependent on a control signal and the switching means being designed to disregard the control signal and to ensure that the external device is switched off upon provision of a triggering signal to the switching means; and a triggering means adapted for providing the triggering signal to the switching means depending on the control signal and the comparison signal, or depending on the switching signal and the comparison signal.

With respect to another embodiment, an error detection apparatus for detecting an error in a power signal output by an external device switchable by a switching signal, comprises:

an influencing means for influencing the power signal or a signal derived from the power signal, such that the power signal or the signal derived from the power signal has a predetermined relationship to a reference signal in the case of an occurrence of the error, and that the power signal or the signal derived from the power signal does not fulfill the predetermined relationship with respect to the reference signal in the case of an absence of the error;

a switching means for providing the switching signal to the external device dependent on a control signal and the switching means being designed to disregard the control signal and to ensure that the external device is switched off upon provision of a triggering signal to the switching means; and a triggering means for providing the triggering signal to the switching means depending on the reference signal and the power signal influenced by the influencing means or the signal derived from the power signal and influenced by the influencing means.

A far safer operation of an external device may be achieved by providing a comparing means for comparing the power signal or a signal derived from the power signal with a reference signal in order to yield a comparison signal and a triggering means for providing a triggering signal to the switching means depending on the control signal and the comparison signal, or depending on the switching signal and the comparison signal, in other words by connecting a series circuit of the comparing means and the triggering means to the switching means in parallel to a signal path providing the control signal to the switching means, with the control signal being also fed to the triggering means. Alternatively, the safer operation can be achieved by providing an influencing means for influencing the power signal or the signal derived from the power signal, such that the power signal or the signal derived from the power signal has a predetermined relationship to a reference signal in the case of the occurrence of the error, and that the power signal or the signal derived from the power signal does not fulfill the predetermined relationship with respect to the reference signal in the case of an absence of the error, as well as a triggering means for providing the triggering signal to the switching means depending on as to whether the power signal has the predetermined relationship to the reference signal.

In one embodiment, the apparatus may comprise the surveillance means already described above, as well as the comparing means and the triggering means, and the power signal or a signal derived from the power signal can be assessed, if the power signal contains an error, by comparing the power signal or a signal derived from the power signal with a reference signal and by taking into account the control signal which is provided to both the triggering means and the switching means.

According to one embodiment, the apparatus, may comprise not only the surveillance means already explained above, but also the influencing means and the triggering means. The power signal or a signal derived from the power signal can thus be altered in the case of an occurrence of an error such that the altered power signal or the altered signal derived from the power signal fulfils the predetermined relationship with respect to a reference signal, which can be detected by the triggering means, so that the occurrence of an error in the power signal can be detected, which leads in the end to a shutdown of the external device.

Figure 2:
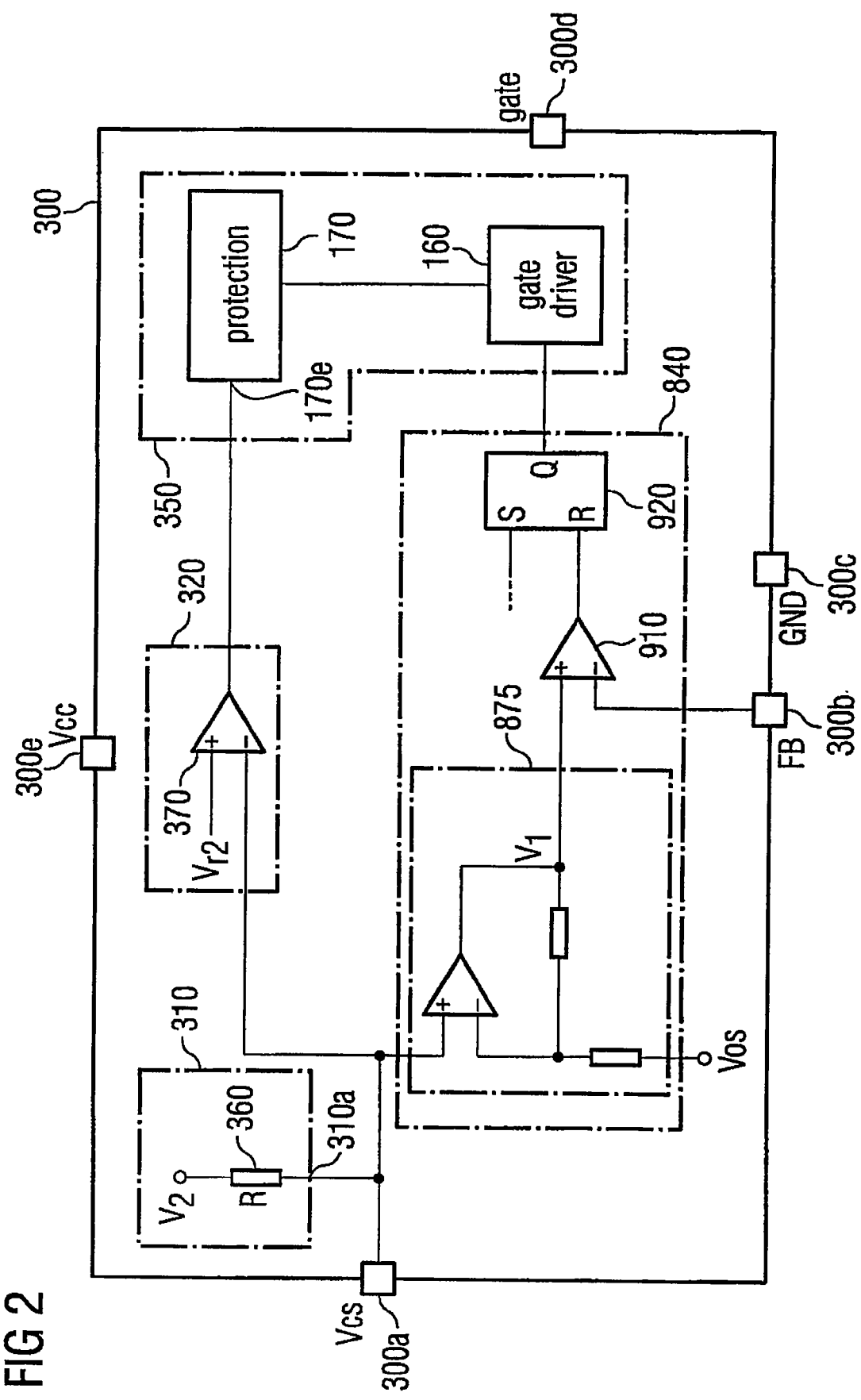
FIG. 2 shows the circuitry of a control IC including an apparatus according to a second embodiment.
Figure 3:
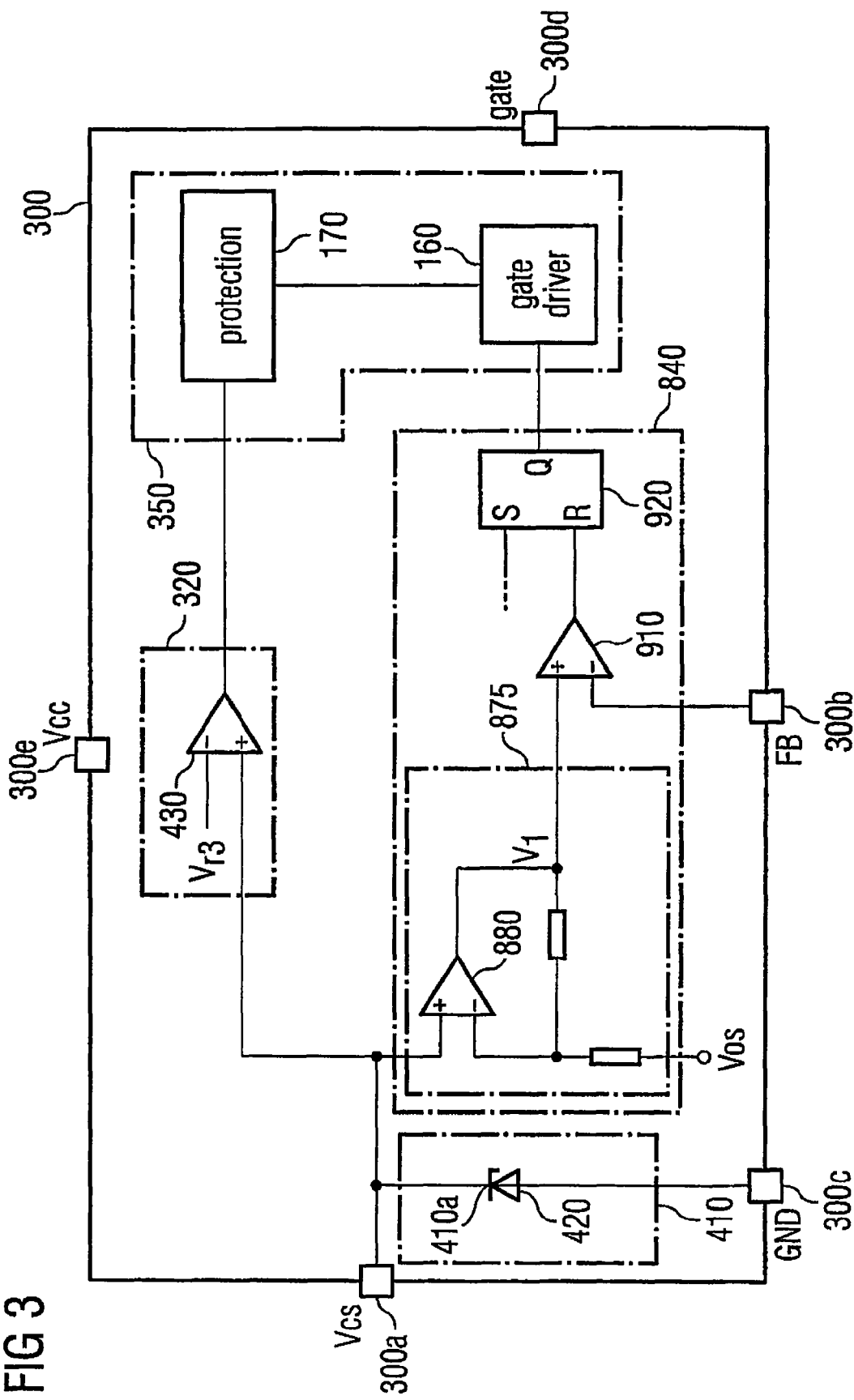
FIG. 3 shows the circuitry of a control IC including an apparatus according to a third embodiment.
Figure 4:
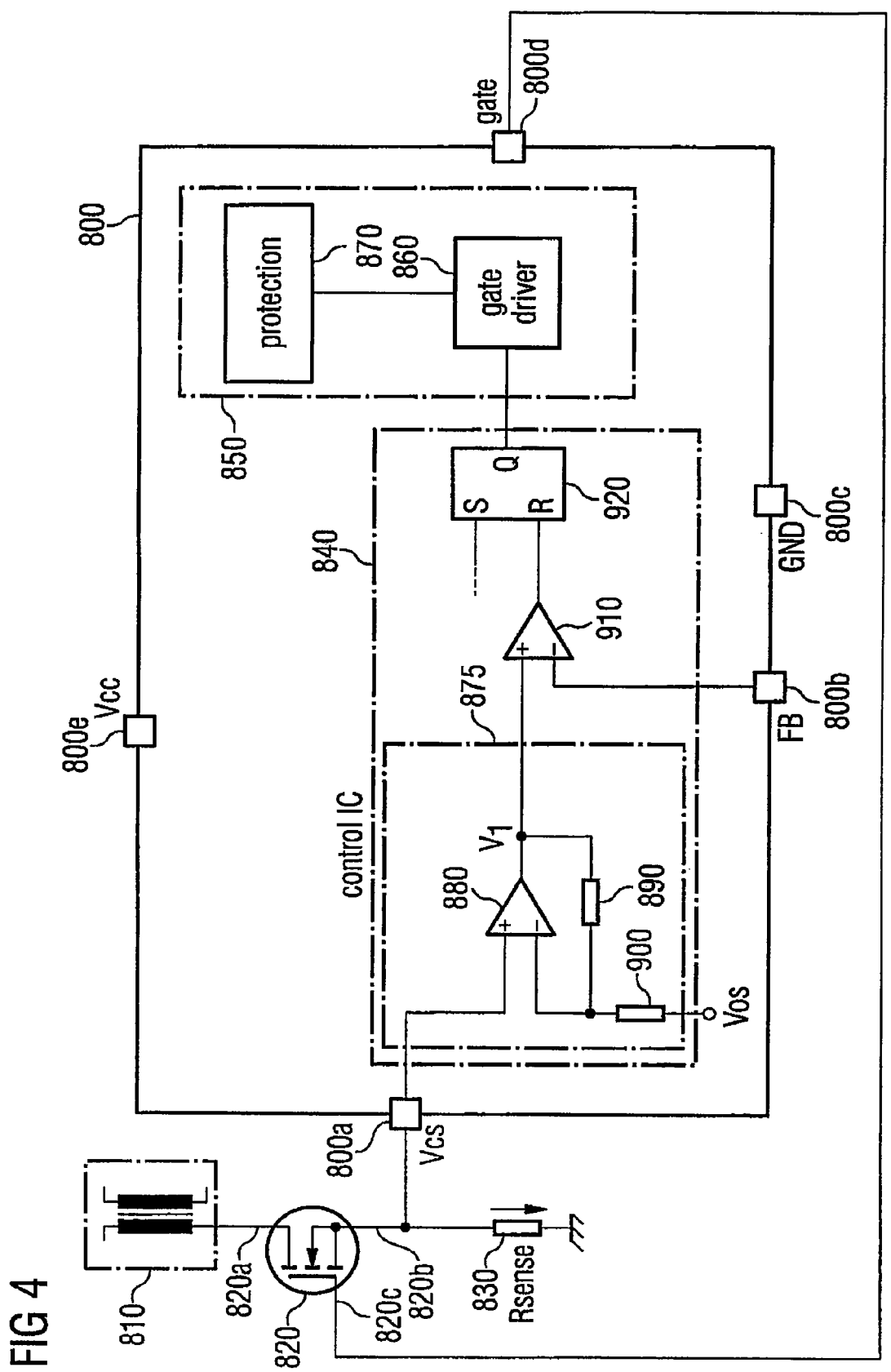
FIG. 4 shows the circuitry of a possible comparison control IC including a power supply, a switch and a sensing or shunt resistor.

In the following, identical or like elements in the figures are indicated by identical or like reference signs, respectively. In particular, elements shown in FIGS. 1-3, which are identical with elements of the introductory part of the specifications in FIG. 4, are not repeatedly described with respect to their mode of operation and bear the same reference sign. Rather, the above description regarding these elements is incorporated hereby to the below description of FIGS. 1-3, and the descriptions of FIGS. 1-3 given below focus on the differences to the design shown in FIG. 4. Reference signs of like elements differ by 700 compared to the reference signs used in FIG. 4.

FIGS. 1-3 show the circuitry of a control IC according to three possible embodiments for protection of a power converter system at failure conditions.

FIG. 1 shows the internal circuitry of a control IC 100 for short pin/shunt resistor protection with the inputs 100a for a power signal, 100b for a feedback signal and 100c for a ground potential, as well as an output 100d conveying the switching signal and an input 100e for the power supply $V_{cc}$ of control IC 100. Additionally to the surveillance means 140 and the switching means 150, which substantially correspond to the surveillance means 840 and the switching means 850 of FIG. 4, respectively, the control IC 100 comprises a comparing means 110, a triggering means 120 having an output for conveying a triggering signal, as well as a delaying means 130, which is denoted in FIG. 1 as LEB (LEB=leading edge blanking). As a difference between the switching means 150 of the present figure and the switching means 850 of FIG. 4, the switching means 150 having an additional input, which is connected to an additional input 170e of the protection means 170. The surveillance means 140 shown in FIG. 1 comprises an additional output compared to the surveillance means 840 of FIG. 4. This additional output 140e conveys the amplified power signal $V_1$ output by the amplifying means 175 comprising the operational amplifier 180, i.e. the output of this operational amplifier is connected to the output 140e of the surveillance means 140. Beside this, the surveillance means 140 also comprises the comparator 210 and the storage means or flip-flop 220, the function of which has been described above. Just as with control IC 800 of FIG. 4, input 100a of the control IC 100 is internally connected in series to the surveillance means 140 and to the switching means 150.

Figure 5:
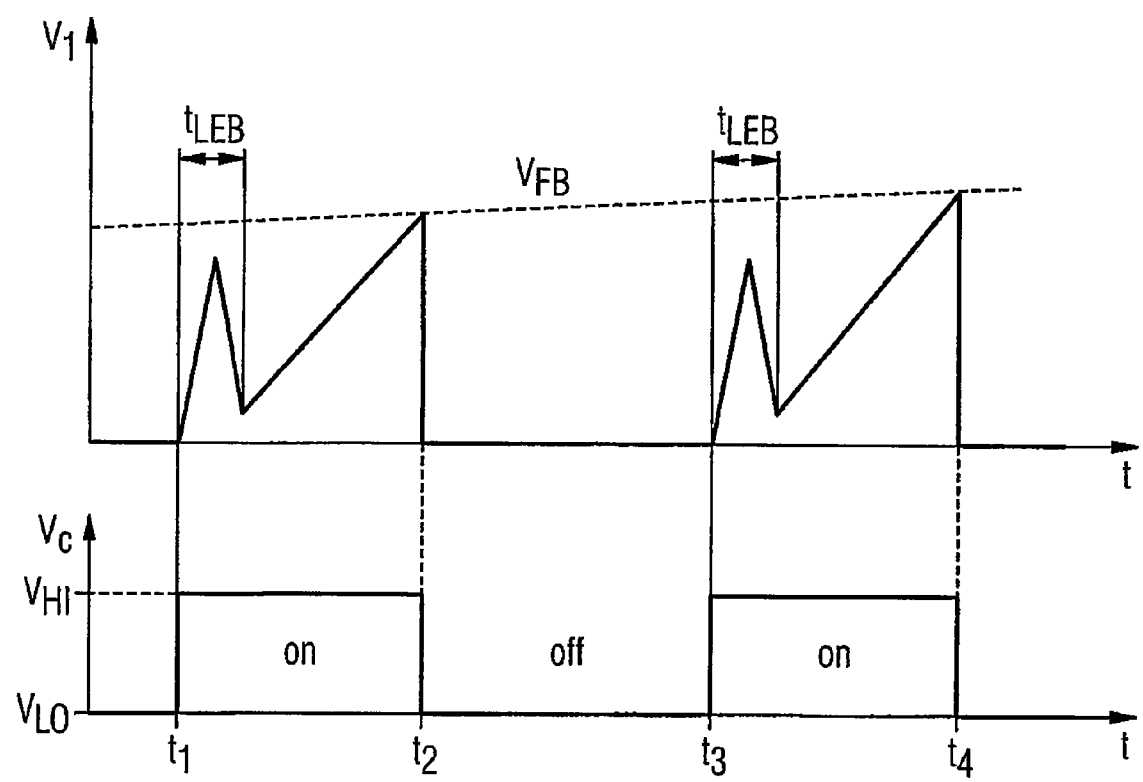
FIG. 5 shows a schematic drawing of a time evolution of exemplary signals occurring in the control IC of FIG. 4.

The comparing means 110 comprises a comparator 190, the triggering means 120 comprises a logical AND-gate 200 with two inputs. Output 140e conveying the amplified power supply signal $V_1$ is connected to an inverting input of the comparator 190 of the comparing means 110. A predetermined internally or externally supplied reference signal $V_{r1}$ is applied to a non-inverting input of the comparator 190 of the comparing means 110. An output of comparator 190 represents an output of the comparing means 110, which in turn represents an input of the triggering means 120, and is connected to a first input of the logical AND-gate 200. An output of the logical AND-gate 200 is connected to the additional input 170e of the protection means 170 of the switching means 170. The output of the surveillance means 140, which is connected to the input of the switching means 150, is also connected to a second input of the logical AND-gate 200 of the triggering means 120 via the delaying means 130. The delaying means 130 is designed such that the signal provided to the input of the delaying means 130 is delayed for a predetermined delay time $t_{LEB}$, if the input signal changes from the voltage level $V_{LO}$ to the voltage level $V_{HI}$. However, if the input signal changes in the opposite direction, i.e. from the voltage level $V_{HI}$ to the voltage level $V_{LO}$, no delay time is applied to the signal by the delaying means 130. This functionality is illustrated in FIG. 5 showing the delay time $t_{LEB}$ with respect to the amplified power signal $V_1$ when at the moments of time $t=t_1$ and $t=t_3$ the voltage level of the control signal comprises a leading edge and changes from $V_{LO}$ to $V_{HI}$.

The circuit shown in FIG. 1 provides a protection against a short circuit of the pin related to input 100a of the control IC 100, connecting the signal $V_{cs}$ to ground. Such a short circuit can be, for instance, caused by a failure in the soldering or a short circuit of the shunt resistor or the sensing resistor 830 (FIG. 4), which is not shown in FIG. 1 for the sake of a greater scale, which also applies to the FIGS. 2 and 3. In the normal mode of operation, i.e. in the absence of a short circuit to ground and with the power signal maintained within the desired state by the surveillance means 140, the power signal having a voltage level $V_{cs}$ should increase in voltage at the pin corresponding to input 100*a* shortly after the control signal at output Q of flip-flop 220 is switched from the voltage level $V_{LO}$ to the voltage level $V_{HI}$, which is transformed by the switching means 150 into a switching signal at the output 100*d* of the control IC 100 resulting in closing the switch 820 (FIG. 4). The amplified power signal $V_1$ provided at the output 140*e* of the surveillance means 140 is provided to the comparing means 110. As long as the amplified power signal at the voltage level $V_1$ is smaller than the reference signal having voltage level $V_{r1}$, the comparator 190 provides at the output a comparing signal being equal to a logical HI. However, as soon as the amplified power signal $V_1$ exceeds the reference signal $V_{r1}$, comparator 190 provides at its output a comparing signal which equals a logical LO. Thus, as long as the amplified power signal $V_1$ exceeds the reference signal $V_{r1}$ within the delaying time $t_{LEB}$ of the delaying means 130, the triggering means 120 will not provide a triggering signal at its output resulting in the protection means 170 inside the switching means 150 being triggered. To be more precise, the protection means 170 is designed such that once a triggering signal resulting in a triggering of the protection means 170, such as a logical HI, appears at the input 170*e*, the protection means 170 outputs to the driving means 160 a fault signal having a first value resulting in the driving means 160 operating in a normal mode as described below, maintains this fault signal until a reset or the like is performed by means of an extra signal not shown in FIG. 1. The driving means 160 is designed such that as long as the fault signal provided to the driving means 160 assumes the first value, such as a logical HI, the gate driver or driving means 160 operates in a protection mode, in which the output of the driving means 160 leads to a shutdown of the external device, i.e. to open the power switch 820. Thus as long as input 100*a* is properly connected to the external device, the temporary situation where $V_1$ is smaller than $V_{r1}$ does not lead to switching the driving means 160 into the protection mode due to the provision of the delaying means LEB 130, which inhibits the forwarding of the comparison signal to the protection means 170 for a time period $t_{LEB}$ chosen such that, under normal conditions, $V_1$ exceeds $V_{r1}$ prior to an expiry of the period of time $t_{LEB}$. However, if the power signal $V_{cs}$ provided to the input of the control IC 100 at its input 100*a* is short-circuited to the ground potential, the voltage $V_{cs}$ and hence the amplified power signal $V_1$ will remain zero with respect to the ground potential, provided that the internal off-set voltage $V_{os}$, which influences the amplified power signal $V_1$, vanishes. In this case, the comparing means 110 will provide at the output a logical HI signal as the comparing signal to the triggering means 120, so that, after the delay time $t_{LEB}$ has passed, at both inputs of the AND-gate 200 a logical HI is provided. As a consequence, the triggering signal provided by the triggering means 120 to the protection means 170 changes to shut down the driving means 160. This means, that the comparing means 110, the triggering means 120 and the delaying means 130 will shut down the external device via the switching means 150 after the predetermined delay time $t_{LEB}$ automatically in the case of the occurrence of the error, i.e. the input 100*a* being short-circuited to ground.

In other words, the circuit shown in FIG. 1 is operative in protecting against short circuit of the $V_{cs}$ pin to ground, that could be caused by failure soldering or a short circuit of the shunt resistor or sensing resistor 830 not shown in FIG. 1. For this protection, the comparator 190 is used. In normal operation, the voltage at the $V_{cs}$ pin should rise after switch-on of the main power switch. However, if this pin is short-circuited to ground, the voltage at this pin is always zero. Therefore, through evaluation of the voltage at the $V_{cs}$ pin after switch-on, the failure situation may be detected in the way that the voltage at the $V_{cs}$ pin is compared with an internal reference $V_{r1}$. In the case of normal operation, the result of the comparison is logic LO, and it is logic HI if the pin $V_{cs}$ is shorted to ground. The output of the comparator is evaluated only when a switch-on signal is provided by the enable pin of the comparator. In case the output of the comparator 190 is logic HI, it indicates a failure or error situation of short circuit, and thus accordingly the power switch 820, not shown in FIG. 1, is switched off. For the enable signal to the triggering means 120 the switching signal applied to the main power switch or the control signal, subject to the leading blanking time delay, can be used. The latter case is shown in FIG. 1. This means that the external device will be switched off by the error detecting apparatus comprising a comparing means, a switching means and a triggering means after the time $t_{LEB}$ has passed. The delay time $t_{LEB}$ has to be predetermined in a way, that on the one hand the amplified power signal $V_1$ becomes larger than the reference voltage $V_{r1}$ within the time $t_{LEB}$ after providing the control signal to switch on the power supply or the power supply converter. On the other hand the delay time $t_{LEB}$ has to be as short as possible, because the external device will remain switched on for at least the time $t_{LEB}$.

FIG. 2 shows a second embodiment, which provides an open circuit protection of the $V_{cs}$ pin. Many of the components of the IC 300 of FIG. 2 are identical to the respective components of the IC 800 of FIG. 1 and are indicated with the same reference numbers. The control IC 300 comprises, like the control IC 800 of FIG. 4, an input 300*a* for the power signal $V_{cs}$, an input 300*b* for the feedback signal, an input 300*c* for ground potential, an output 300*d* for the switching signal and an input 300*e* for the power supply voltage $V_{cc}$ of the control IC 300. Furthermore it comprises a surveillance means 840, which is equal to the surveillance means 840 shown in FIG. 4 and comprises an amplifying means 875, a comparator 910 and a storage means 920. Additionally, the control IC 300 comprises besides the switching means 350 with an input for a control signal, an output for a switching signal and an input for a triggering signal an influencing means 310, and a triggering means 320. The switching means 350 is equal to the switching means 150 shown in FIG. 1.

Inside control IC 300, input 300*a* is connected not only to the input of the surveillance means 840, but also to a terminal 310*a* of the influencing means 310, and an input of the triggering means 320. An output of the triggering means 320 is connected to a further input of the switching means 350 and is dedicated for outputting triggering signal to the switching means 350, which is, in turn, as in the case of FIG. 1, connected to the further input 170*e* of protecting means 170. The triggering means 320 comprises a comparator 370, to the inverting input of which a reference signal $V_{r2}$ is applied.

The influencing means 310 comprises a resistor 360, which is connected between terminals 310*a* and a terminal to which a predetermined internally or externally supplied voltage $V_2$ is applied.

The IC 300 of FIG. 2 is suitable for protection of an external converter system against open circuit of the $V_{cs}$ pin 300*a* to external. The reference voltage $V_{r2}$ provided to the triggering means 320 is preferably chosen such that $V_{r2}$ is larger than any voltage level $V_{cs}$ the power signal assumes in normal mode of operation, i.e. the absence of any disconnection of input 300*a*. The voltage $V_2$ provided to the influencing means 310 is preferably chosen to be larger than the reference voltage $V_{r2}$. The resistance of the resistor 360 should be large compared to the resistance $R_{sense}$ of the shunt resistor of sensing resistor 830, which is not shown in FIG. 2. The ratio of the resistance of the sensing resistor 830 to the resistance of the resistor 360 is preferably smaller than 0.2 or 20%. The choice of this resistance ratio ensures that the influencing means 310 does not significantly disturb the power signal with the voltage level $V_{cs}$ in the normal mode of operation. In the normal mode of operation, the voltage level of the power signal $V_{cs}$ is always lower than the voltage level $V_{r2}$ of the reference signal provided to the triggering means 320. As a consequence, the triggering means 320 will not provide a triggering signal, so that the switching means 350 and the driving means 160, respectively, remain in the normal mode of operation. If, however, an error occurs with respect to the pin related to input 300a of the control IC 300, such that this pin has no connection to the power signal, the voltage level $V_{cs}$ will be pulled up to the level of the voltage $V_2$, so that the triggering means 320 will be provided with a voltage level that exceeds the voltage level of the reference voltage $V_{r2}$. As a consequence, the triggering means 320 or the comparator 370 will provide the switching means 350 with a triggering signal of a level, that results in the driving means 160 acting in the protection mode no longer providing output 300d of the control IC 300 with a switching signal, so that the external device 810, which is not shown in FIG. 2, is switched off. Thus, even in case of an accidental disconnection of pin 300a, the power supply converter 810 (FIG. 4) is save since power switch 820 is turned off independent of the control signal provided by the surveillance means 840.

In other words, for protection against open circuit at the $V_{cs}$ pin 300a (due to no connection of this pin by fault soldering to external environment, for example) the resistor 360 is added, which is connected between the internal reference voltage $V_2$ and the $V_{cs}$ pin 300a. As usual and already mentioned, the reference voltage $V_{r2}$ is higher than the highest value of the voltage which would show at the feedback or regulation pin 300b. In the case of open circuit of the $V_{cs}$ pin 300a, the voltage at the $V_{cs}$ pin 300a will be pulled up by the resistor 360 to be the reference voltage $V_2$ and no longer to be floating. As a result, the power switch 820, not shown in FIG. 2, may be switched on, which is a result of the internal control signal provided to the switching means 350 by the surveillance means 840. But the power switch 820, which is not shown in FIG. 2, is switched off immediately due to the fact that the voltage at the $V_{cs}$ pin 300a is higher than the reference or feedback/regulation voltage $V_{r2}$.

Therefore, the converter system is not in any danger if an open circuit happens to this pin 300a. Furthermore, the control IC 300 can be switched off permanently by the additional comparator 370 comprised in the triggering means 320 if an open circuit happens. This avoids any further switching of the power switch 820, not shown in FIG. 2, since any further switching is not wanted.

FIG. 3 shows a third embodiment for protection against open shunt resistor. The control IC 300 differs merely from the control IC 300 of FIG. 2 with respect to the physical structure shown in the figures in the internal design of the influencing means 410, which in the present case, has a Zener diode 420 connected between terminal 410a being in connection with input 300a, the non-inverting input of operational amplifier 880 and a non-inverting input of a comparator 430, and ground input 300c in reverse direction, i.e. such that the cathode of the Zener diode is connected to the terminal 410a and the anode of the Zener diode is connected to the ground potential at input 300c.

The circuit layout shown in FIG. 3 forms an apparatus for detecting an error in the power signal provided to the control IC 300 at the input 300a in the case that the shunt or sensing resistor 830, which is not shown in FIG. 3, is left open, for instance because the connection to the ground potential or the connection to the power switch 820, which is not shown in FIG. 3, is not correct. In this situation, the primary current of the external device 810, which is not shown in FIG. 3, tends to flow into input 300a of the control IC 300. As a consequence, a very high voltage may be present at the input 300a, which could lead to the destruction of the control IC 300 or even to the destruction of the external device 810, for instance a power supply converter, which is not shown in FIG. 3. To prevent such an error from happening, the influencing means 410 comprises the Zener diode 420. In other words, in the case that an open circuit occurs when the shunt resistor or sensing resistor 830, which is not shown in FIG. 3, is left open, e.g. the connection to ground or the connection to the power switch 820, which is not shown in FIG. 3, is not correct, the primary current tends to flow into the $V_{cs}$ pin 300a resulting in a high voltage at the pin $V_{cs}$ 300a of the control IC 300. This high voltage may destroy the controller before any other protection takes place or due to the propagation delay. For this reason the Zener diode 420 is added, as shown in FIG. 3. With this diode 420 in place, the voltage shown at this pin 300a is limited, and other protection, e.g. provided by the surveillance means 840, may be invoked to switch off the power switch 820, which is not shown in FIG. 3. However, this may result in continuous switching of the power switch 820 in the failure or error condition, as the Zener diode 420 may reach its thermal limits. In other words, solely by means of the Zener diode 420, the control IC 300 may not be really protected against open shunt or sensing resistor 830. To enable a permanent switch-off of the control IC 300 at this failure or error situation, the triggering means 320 with the comparator 430 helps. Once the voltage at the $V_{cs}$ pin 300a exceeds a reference voltage $V_{r3}$ provided to the triggering means 320 at the inverting input of comparator 430, the switching means 350 and the gate driver or the driving means 160 comprised in the switching means 350 is disabled by the triggering signal provided by the triggering means 320. As a consequence, no switching pulse can pass through the gate driver 160 any more. Therefore, there is no switching action any more at this failure or error situation. The reference voltage $V_{r3}$ is preferably chosen such that it exceeds any voltage level $V_{cs}$ present at the pin 300a of control IC 300 under normal conditions, i.e. the sensing resistor 830 (FIG. 4) is properly connected to the ground potential and the power switch and when the power signal is maintained in the desired range by the control of the surveillance means 840. The voltage level $V_{r3}$ of the reference signal can be identically chosen with respect to the reference voltage level $V_{r2}$ of the embodiment shown in FIG. 2. The Zener diode 420 is designed to have a Zener voltage such that, in normal conditions, the Zener voltage exceeds the reference voltage $V_{r3}$, such that in the occurrence of a non-proper connection of the sensing resistor 830 the triggering means 320 provides the protection means 170 with a triggering signal leading to a shut down of the power supply converter.

Apart from the embodiments described above, also combinations of several embodiments are possible. For instance, the embodiment shown in FIG. 1 can be combined with one of the embodiments shown in FIG. 2 or 3 by using the signal derived from the power signal for short circuit protection to ground potential of the pin conveying the power signal according to FIG. 1 and by using the power signal itself for protection against an open shunt resistor 830 (FIG. 4) or an open circuit of the $V_{cs}$ pin conveying the power signal according to FIG. 2 or 3. As the embodiments have shown, a flexible and reliable apparatus for detecting an error in a power signal which is output by an external switchable device can be provided. A control IC can be developed and designed to provide a wide range of protection schemes and mechanisms to detect and to evaluate error situations based on the power signal provided by an external device. Such a protection scheme can drastically reduce the costs for repairs and replacements of damaged parts, as well as reduce the risks or the health and lives of human beings.

Furthermore the embodiments described in FIGS. 1-3 can be modified by adding a further delaying means, such as the delaying means 130 in FIG. 1, in between the surveillance means 140, 840 and the switching means 150, 350. The further delaying means can be designed to delay the forwarding of the control signal output by the surveillance means 140, 840 for a predetermined delay time dependent on the control signal. In other words, the control signal or the control signal in a delayed form can be used as an input of the switching means.

Furthermore the delaying means 130 in FIG. 1 can be omitted, if the power supply is working in a continuous mode of operation, since in this case no precaution as to stop the temporary state, in which the power signal $V_{cs}$ is smaller than the reference signal $V_{r1}$ must be ensured. In other words, the control signal of the surveillance means 140 can be used as an enable signal for the triggering means 120 in a time delayed form, as shown in FIG. 1, or in a non-delayed form.

In yet other words, the above described embodiments show a control IC 100, 300 of a switching mode power supply system comprising a power transformer 810 having one primary winding, a power switch 820, a high current carrying pin connected to one terminal of the power transformer 810, and a shunt resistor 830 connected to another high current carrying pin of the power switch 820 and system ground for primary current sensing, the power switch 820 having a controllable pin receiving control signal from a controller 100, the controller comprising a pin 100b receiving the feedback signal from output of said power converter 810, a pin 100a receiving the voltage from the said shunt resistor 830, a control signal generator unit 140 and the control unit 140 using the signals from said feedback and said shunt resistor 830 for turn-off determination of the power switch 820, and the power system being protected against short circuit of the said shunt resistor 830 or the pin 100a receiving voltage from said shunt resistor 830, wherein the voltage at pin 100a is compared with the reference voltage in the controller 100 and the output from the comparator 190 evaluated together with the switching signal and the said control signal is blocked permanently in un-normal operation.

The above described embodiments show a power supply system comprising a power transformer 810 having one primary winding, a power switch 820, a high current carrying pin connected to one terminal of the power transformer 810, a shunt resistor 830 connected to another high current carrying pin of the power switch 820, and system ground for primary current sensing and the power switch 820 having a controllable pin receiving control signal from a controller 300, the controller 300 comprising a pin 300b receiving the feedback signal from the output of the power converter 810, the pin 300a receiving voltage from the shunt resistor 830, and a control signal generator unit 840, the control unit 840 using signals from the feedback and the shunt resistor 830 for turn-off determination of the power switch 820, wherein the said power system is protected against open circuit of the said pin 300a tending to receive signal from the shunt resistor 830, wherein the pull-up resistor 360 is integrated in the controller 300, the pull-up resistor 360 pulls up the voltage at the pin 300a, and the power switch 820 is switched off directly after switch-on in the case of an open circuit of the pin 300a.

The above described embodiments show a power supply system comprising a power transformer 810 having one primary winding, a power switch 820, a high current carrying pin connected to one terminal of the power transformer 810, a shunt resistor 830 connected to another high current carrying pin of the power switch 820, and system ground for primary current sensing and the power switch 820 having a controllable pin receiving control signal from a controller 300, the controller 300 comprising a pin 300b receiving the feedback signal from the output of the power converter 810, the pin 300a receiving voltage from the shunt resistor 830, and a control signal generator unit 840, the control unit 840 using signals from the feedback and the shunt resistor 830 for turn-off determination of the power switch 820, wherein the said power system is protected against open circuit of the said pin 300a tending to receive signal from the shunt resistor 830, wherein the pull-up resistor 360 is integrated in the controller 300, the pull-up resistor 360 pulls up the voltage at the pin 300a, and the voltage at pin 300a is compared with a reference voltage, such that the said power switch 820 is switched off directly after switch-on in the case of an open circuit of the said pin 300a and the said control signal is blocked by exceeding said reference voltage of voltage at said pin 300a.

The above described embodiments show a control IC 300 of a switching mode power supply system comprising a power transformer 810 having one primary winding, a power switch 820, a high current carrying pin connected to one terminal of the power transformer 810, a shunt resistor 830 connected to another high current carrying pin of the power switch 820 and system ground for primary current sensing, the power switch 820 having a controllable pin receiving control signal from the controller 300, and the controller comprising a pin 300b for receiving a feedback signal from an output of the power converter 810, a pin 300a for receiving a voltage from the shunt resistor 330, a control signal generator unit 840 and said control unit 840 using signals from said feedback and the said shunt resistor 830 for turn-off determination of the power switch 820, wherein the power system is protected against open circuit of the shunt resistor 830 at either terminal and a Zener diode 420 is integrated in the controller 300 limiting the voltage at the pin 300a tending to receive signal from the shunt resistor 830 and the voltage at the pin 300a is compared with a reference voltage, and the power switch 820 is turned off immediately by exceeding the reference voltage of the voltage at the pin 300a.

The above described embodiments show a control IC 300 of a switching mode power supply system comprising a power transformer 810 having one primary winding, a power switch 820, a high current carrying pin connected to one terminal of the power transformer 810, a shunt resistor 830 connected to another high current carrying pin of the power switch 820 and system ground for primary current sensing, the power switch 820 having a controllable pin receiving control signal from the controller 300, and the controller comprising a pin 300b for receiving a feedback signal from an output of the power converter, a pin 300a for receiving a voltage from the shunt resistor 330, a control signal generator unit 840 and said control unit 840 using signals from said feedback and the said shunt resistor 830 for turn-off determination of the power switch 820, wherein the power system is protected against open circuit of the shunt resistor 830 at either terminal and a Zener diode 420 is integrated in the controller 300 limiting the voltage at the pin 300a tending to receive signal from the shunt resistor 830 and the voltage at the pin 300a is compared with a reference voltage, and the control signal is blocked permanently by exceeding the reference voltage by the voltage at the pin 300a.

According to special circumstances, the embodiment or method can be implemented in hardware or software. The implementation can be realized on a digital storage device, especially a disc or CD with electronically readable control signals which can interact with a programmable computer system such that the appropriate methods can be executed. Generally, a computer program product with a program code for executing the method stored on a device readable by a machine, if the computer program product is executed on a computer can be provided. In other words, an embodiment can be realized as a computer program with a program code for executing the method, if the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An error detection apparatus for detecting an error in a power signal output by an external device switchable by a switching signal, comprising:
    a comparing unit adapted for comparing the power signal or a signal derived from the power signal with a reference signal in order to yield a comparison signal;
    a switching unit adapted for providing the switching signal to the external device dependent on a control signal, the switching unit being designed to disregard the control signal and to ensure that the external device is switched off upon provision of a triggering signal to the switching unit;
    a triggering unit adapted for providing the triggering signal to the switching unit depending on the control signal and the comparison signal, or depending on the switching signal and the comparison signal;
    wherein the switching unit comprises:
        a protection unit adapted to provide a fault signal that is distinct from the control signal and where the fault signal is maintained upon the switching unit receiving the triggering signal until a reset signal is received, and
    a driving unit adapted to provide the switching signal depending on the control signal unless the driving unit is supplied with the fault signal; and
        a surveillance unit adapted for surveying the power signal or the signal derived from the power signal as to whether the power signal assumes an undesired state and for influencing the control signal upon an occurrence of the undesired state.

2. The apparatus according to claim 1, wherein the surveillance unit comprises: an amplifying unit adapted for amplifying the power signal in order to yield an amplified signal; a comparator adapted for comparing the amplified signal with a surveillance signal in order to yield a reset signal; and a storage unit adapted for creating the control signal depending on a set signal and the reset signal.

3. The apparatus according to claim 1, further comprising a first delaying unit adapted for delaying the control signal and passing the control signal in a delayed form to the triggering unit.

4. The apparatus according to claim 3, wherein the first delaying unit is designed to delay the control signal by a delaying time dependent on the control signal.

5. The apparatus according to claim 1, further comprising a delaying unit adapted for delaying the control signal and passing the control signal in a delayed form to the switching unit.

6. The apparatus according to claim 1, wherein the external device comprises a power transformer.

7. The apparatus according to claim 1, wherein the apparatus is dedicated to be connected to the external device such that the power signal is created as a voltage drop across a sensing resistor created by a current created by the external device, with the sensing resistor being connected between the external device and a ground potential.

8. An error detection apparatus for detecting an error in a power signal output by an external device switchable by a switching signal, comprising:
    a comparing unit adapted for comparing the power signal or a signal derived from the power signal with a reference signal in order to yield a comparison signal;
    a switching unit adapted for providing the switching signal to the external device dependent on a control signal, the switching unit being designed to disregard the control signal and to ensure that the external device is switched off upon provision of a triggering signal to the switching unit; and
    a triggering unit adapted for providing the triggering signal to the switching unit depending on the control signal and the comparison signal, or depending on the switching signal and the comparison signal;
    wherein the switching unit comprises:
        a protection unit adapted to provide a fault signal that is distinct from the control signal and where the fault signal is maintained upon the switching unit receiving the triggering signal until a reset signal is received, and
    a driving unit adapted to provide the switching signal depending on the control signal unless the driving unit is supplied with the fault signal; and
    wherein the triggering unit consists of a logical AND-gate.

9. An error detection apparatus for detecting an error in a power signal output by a external device switchable by a switching signal, comprising:
    an influencing unit adapted for influencing the power signal or a signal derived from the power signal, such that the power signal or the signal derived from the power signal has a predetermined relationship to a reference signal in the case of the occurrence of the error, and that the power signal or the signal derived from the power signal does not fulfill the predetermined relationship with respect to the reference signal in the case of an absence of the error;
    a switching unit adapted for providing the switching signal to the external device dependent on a control signal, the switching unit being designed to disregard the control signal and to ensure that the external device is switched off upon provision of a triggering signal to the switching unit;
    a triggering unit adapted for providing the triggering signal to the switching unit depending on as to whether the power signal or the signal derived from the power signal has the predetermined relationship to the reference signal;
    wherein the switching unit comprises:
        a protection unit adapted to provide a fault signal that is distinct from the control signal and where the fault signal is maintained upon the switching unit receiving the triggering signal until a reset signal is received, and a driving unit adapted to provide the switching signal depending on the control signal unless the driving unit is supplied with the fault signal; and a surveillance unit adapted for surveying the power signal or the signal derived from the power signal as to whether the power signal assumes an undesired state and for influencing the control signal upon an occurrence of the undesired state.

10. The apparatus according to claim 9, wherein the surveillance unit comprises: an amplifying unit adapted for amplifying the power signal in order to yield an amplified signal, a comparator adapted for comparing the amplified signal with a surveillance signal in order to yield a reset signal; and a storage unit adapted for creating the control signal depending on a set signal and the reset signal.

11. The apparatus according to claim 9, further comprising: a delaying unit adapted for delaying the control signal and passing the control signal in a delayed form on to the switching unit.

12. The apparatus according to claim 11, wherein the delaying unit is designed to delay the control signal for a delay time dependent on the control signal.

13. The apparatus according to claim 9, wherein the external device comprises a power transformer.

14. The apparatus according to claim 9, wherein the apparatus is dedicated to be connected to the external device such that the power signal is created as a voltage drop across a sensing resistor created by a current created by the external device, with the sensing resistor being connected between the external device and a ground potential.

15. An error detection apparatus for detecting an error in a power signal output by a external device switchable by a switching signal, comprising:

an influencing unit adapted for influencing the power signal or a signal derived from the power signal, such that the power signal or the signal derived from the power signal has a predetermined relationship to a reference signal in the case of the occurrence of the error, and that the power signal or the signal derived from the power signal does not fulfill the predetermined relationship with respect to the reference signal in the case of an absence of the error;

a switching unit adapted for providing the switching signal to the external device dependent on a control signal, the switching unit being designed to disregard the control signal and to ensure that the external device is switched off upon provision of a triggering signal to the switching unit; and a triggering unit adapted for providing the triggering signal to the switching unit depending on as to whether the power signal or the signal derived from the power signal has the predetermined relationship to the reference signal;

wherein the switching unit comprises:

a protection unit adapted to provide a fault signal that is distinct from the control signal and where the fault signal is maintained upon the switching unit receiving the triggering signal until a reset signal is received, and a driving unit adapted to provide the switching signal depending on the control signal unless the driving unit is supplied with the fault signal, wherein the influencing unit comprises a resistor connected between a predetermined voltage potential and a signal line conveying the power signal, wherein the predetermined voltage potential is larger than a potential of the reference signal indicative of the predetermined relationship.

16. An error detection apparatus for detecting an error in a power signal output by a external device switchable by a switching signal, comprising:

an influencing unit adapted for influencing the power signal or a signal derived from the power signal, such that the power signal or the signal derived from the power signal has a predetermined relationship to a reference signal in the case of the occurrence of the error, and that the power signal or the signal derived from the power signal does not fulfill the predetermined relationship with respect to the reference signal in the case of an absence of the error;

a switching unit adapted for providing the switching signal to the external device dependent on a control signal, the switching unit being designed to disregard the control signal and to ensure that the external device is switched off upon provision of a triggering signal to the switching unit; and a triggering unit adapted for providing the triggering signal to the switching unit depending on as to whether the power signal or the signal derived from the power signal has the predetermined relationship to the reference signal;

wherein the switching unit comprises:

a protection unit adapted to provide a fault signal that is distinct from the control signal and where the fault signal is maintained upon the switching unit receiving the triggering signal until a reset signal is received, and a driving unit adapted to provide the switching signal depending on the control signal unless the driving unit is supplied with the fault signal, wherein the influencing unit comprises a Zener diode connected between a signal line conveying the power signal and the ground potential in reverse direction.

17. An error detection apparatus for detecting an error in a power signal output by a external device switchable by a switching signal, comprising:

an influencing unit adapted for influencing the power signal or a signal derived from the power signal, such that the power signal or the signal derived from the power signal has a predetermined relationship to a reference signal in the case of the occurrence of the error, and that the power signal or the signal derived from the power signal does not fulfill the predetermined relationship with respect to the reference signal in the case of an absence of the error;

a switching unit adapted for providing the switching signal to the external device dependent on a control signal, the switching unit being designed to disregard the control signal and to ensure that the external device is switched off upon provision of a triggering signal to the switching unit; and a triggering unit adapted for providing the triggering signal to the switching unit depending on as to whether the power signal or the signal derived from the power signal has the predetermined relationship to the reference signal;

wherein the switching unit comprises:

a protection unit adapted to provide a fault signal that is distinct from the control signal and where the fault signal is maintained upon the switching unit receiving the triggering signal until a reset signal is received, and a driving unit adapted to provide the switching signal depending on the control signal unless the driving unit is supplied with the fault signal, wherein the triggering unit comprises a comparator for comparing the power signal or the signal derived from the power signal and a reference signal in order to yield the triggering signal.

18. An error detection apparatus for detecting an error in a power signal output by an external device switchable by a switching signal, comprising:

an influencing unit adapted for influencing the power signal or a signal derived from the power signal, such that the power signal or the signal derived from the power signal has a predetermined relationship to a reference signal in the case of the occurrence of the error, and that the power signal or the signal derived from the power signal does not fulfill the predetermined relationship with respect to the reference signal in the case of an absence of the error, wherein the influencing unit comprises a resistor connected between a predetermined voltage potential and a signal line conveying the power signal, the predetermined voltage potential being larger than a potential of the reference signal indicative of the predetermined relationship;

a switching unit adapted for providing the switching signal to the external device dependent on a control signal, the switching unit being designed to disregard the control signal and to ensure that the external device is switched off upon provision of a triggering signal to the switching unit; and a triggering unit adapted for providing the triggering signal to the switching unit depending on as to whether the power signal has the predetermined relationship to the reference signal.

\* \* \* \* \*